United States Patent [19]

Janssen

[11] Patent Number: 4,744,670
[45] Date of Patent: May 17, 1988

[54] METHOD AND APPARATUS FOR MONITORING THE TEMPERATURE OF THE PROPULSION GAS AT THE INLET TO A HIGH-PERFORMANCE TURBINE WHEEL

[75] Inventor: John E. Janssen, Minnetonka, Minn.
[73] Assignee: Honeywell, Inc., Minneapolis, Minn.
[21] Appl. No.: 859,666
[22] Filed: May 5, 1986
[51] Int. Cl.$^4$ .......................................... G01K 13/00
[52] U.S. Cl. .................... 374/144; 374/143; 364/431.02
[58] Field of Search ................ 374/143, 144, 148; 364/557, 431.02, 431.03; 318/417; 236/15 C

[56] References Cited

U.S. PATENT DOCUMENTS

| | | | |
|---|---|---|---|
| 2,592,385 | 4/1952 | Borden et al. | 374/144 |
| 2,606,420 | 8/1952 | Moore, Jr. | 374/144 |
| 2,731,794 | 1/1956 | Torell | 374/144 |
| 3,098,387 | 7/1963 | Corbett | 374/143 |
| 3,123,027 | 3/1964 | Livingston | 236/15 C |
| 3,377,848 | 4/1968 | Marvin | 374/144 |
| 3,597,920 | 8/1971 | Wadman | 374/144 |
| 3,789,665 | 2/1974 | Hohenberg | 374/143 |
| 3,990,308 | 11/1976 | McCormick et al. | 374/144 |
| 4,055,997 | 11/1977 | Kniat | 374/144 |
| 4,258,545 | 3/1981 | Slater | 364/431.02 |

FOREIGN PATENT DOCUMENTS

| | | | |
|---|---|---|---|
| 0447840 | 4/1948 | Canada | 236/15 C |
| 0025622 | 3/1981 | European Pat. Off. | 236/15 C |
| 0788084 | 12/1980 | U.S.S.R. | 236/15 C |

Primary Examiner—William A. Cuchlinski, Jr.
Assistant Examiner—Thomas B. Will
Attorney, Agent, or Firm—C. G. Mersereau

[57] ABSTRACT

An apparatus is disclosed for monitoring the temperature of the propulsion gas at the inlet to a turbine wheel in a turbine in which a compressor fuels air into a chamber where it is heated and the heated products exiting the chamber form the propulsion gas. The temperature of the heated products exiting the chamber is a function of the inlet static and total pressure, the total inlet temperature, the static pressure of the heated products and the static pressure drop across the chamber.

5 Claims, 1 Drawing Sheet

METHOD AND APPARATUS FOR MONITORING THE TEMPERATURE OF THE PROPULSION GAS AT THE INLET TO A HIGH-PERFORMANCE TURBINE WHEEL

BACKGROUND OF THE INVENTION

1. Field of the Invention

This invention relates to a novel method and apparatus for monitoring the temperature of the gases exiting from a combustion chamber and particularly to a method and apparatus for use in monitoring the operation of gas turbines.

2. Description of the Prior Art

In a gas turbine, a compressor supplies air for combustion to a plenum, to which one or more combustion chambers are connected. The chambers are mounted and supply hot gas at their outlets to impact vanes on the turbine wheels. Combustion failure, or non-uniform combustion, in one or more combustion chambers not only reduces the turbine output, but also results in thermal stresses in the turbine wheels and uneven impulsion of the wheels. Thermal stress and uneven impulsion reduce the life of the turbine wheels, so that rapid, automatic shut-down of the turbine is necessary to prevent damage to the engine if a combustion failure occurs.

It is well known to monitor combustion chamber operation by optical observation using ultraviolet sensors, for example. But this suffers from the defect that shut-downs can occur by reason of false indications of failure, due to soot accumulation on the observing window. In any event, this process, known as "flame proving", simply indicates that combustion is present, and gives no indication of gas temperature.

A further problem occurs in gas turbine engines with multiple combustion chambers. If the fuel flow to each combustion chamber is not the same, the gas temperatures and velocities entering the turbine will be different at various circumferential locations. This subjects the turbine buckets to both mechanical and thermal vibration. Typical stationary gas turbine engines may tolerate only 50° F. circumferential variation in the temperature of the gas leaving the turbine wheel.

Then too, absolute temperature of the gas entering the inlet nozzles to a turbine wheel is critical. Hence, it is necessary to monitor not only the presence of combustion, but the temperature of the combustion products. High thermal efficiency demands operation with as high a gas temperature as possible. But the strength of the materials from which the nozzles and turbine buckets are made puts an upper limit on operating temperature. Thus, for high efficiency the engine must operate close to the upper temperature limit and with a minimum safety factor in the turbine inlet gas temperature. Because of the very harsh conditions at the inlet to the turbine nozzles, it has not been feasible to use thermocouples or other temperature sensors to monitor the turbine inlet temperature directly. Temperature sensors may be placed in the exhaust from the turbine wheel, but this requires that the inlet temperature be calculated from the outlet temperature and the load on the turbine. Changes in load, air flow, or fuel flow can produce rapid changes in gas temperature at the turbine inlet. An object of this invention is the provision of a way to quickly detect the temperature and any changes in the temperature of a gas used to drive a high-performance turbine.

SUMMARY OF THE INVENTION

The present invention contemplates determining the temperature at the combustion chamber outlet by measuring the pressure drop through the combustion chamber and the air temperature entering the combustion chamber.

Various advantages and features of novelty which characterize the invention are pointed out with particularity in the claims annexed hereto and forming a part hereof. However, for a better understanding of the invention, its advantages, and objects attained by its use, reference should be made to the drawing which forms a further part hereof, and to the accompanying descriptive matter, in which there is illustrated and described a preferred embodiment of the invention.

DETAILED DESCRIPTION OF THE PREFERRED EMBODIMENTS

A gas flowing through a duct of a constant cross-sectional area accelerates when it is heated. The addition of heat causes the gas to expand and thus increase its velocity. The heat addition is a thermo-dynamically irreversible process and is accompanied by an increase in entropy of the gas. This increase in entropy is accompanied by a loss in both the total and static pressure of the gas. The loss in pressure as a result of the addition of heat is directly related to both the total and static temperature rise in the gas.

In accordance with the teachings of this invention, the temperature of the compressed air fed to the combustion chamber of a turbine is measured or determined along with its pressure and its velocity. The static pressure at the outlet of the combustion chamber is measured and the pressure loss in the combustion chamber is determined. This pressure loss is a function of the temperature rise in the gas due to the addition of heat in the combustion chamber and based upon this functional relationship the temperature rise is determined. Adding the temperature rise to the inlet temperature of the combustion chamber establishes the temperature at the outlet which is the temperature of the gas entering the turbine.

Figure 1:
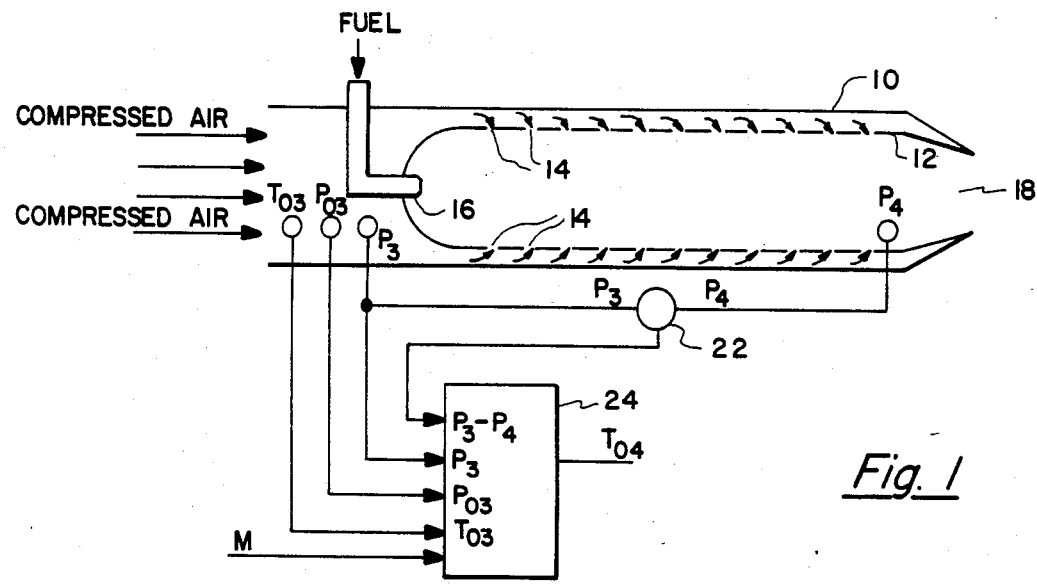
FIG. 1 is a schematic view of a turbine combustion chamber and pressure measuring devices employed in accordance with the teachings of this invention to determine the temperature of the gas exiting from the chamber.

Referring now to FIG. 1, a gas turbine combustion chamber has an outer casing 10 and a combustion chamber lining 12 with a series of ports 14 formed therein through which air is fed by a suitable compressor (not shown). A nozzle 16 supplies fuel to the combustion chamber and the heated gases exit through an outlet 18 to the inlet of the turbine.

The temperature of the gases exiting from the combustion chamber through outlet 18 is determined as a function of the difference in static pressure at the inlet to the combustion chamber $P_3$ and the static pressure at the outlet 18 of the combustion chamber $P_4$.

FIG. 1 indicates schematically the data point sensors used to determine the pressure drop in the combustion chamber due to the temperature rise in the combustion chamber. These data point sensors are an absolute total temperature sensor $T_{03}$, which includes both the static temperature and the temperature equivalent of the velocity head. This temperature can be measured with a suitable thermocouple. A sensor $P_{03}$ to measure the total pressure (velocity plus static) at the inlet to the combustion chamber and another sensor $P_3$ to measure the static pressure at the combustion chamber inlet.

Another static pressure sensor $P_4$ located closely adjacent to the outlet of the combustion chamber measures the output static pressure of the combustion gases. A suitable differential pressure sensor 22 provides a signal indicative of the difference between the static input pressure and the static output pressure to the combustion chamber.

These outputs, along with the Mach No. of the compressed air input to the combustion chamber, are coupled to a suitable micro-processor 24 or other calculating device known in the art in order to calculate the output temperature $T_{04}$.

The Mach No. of the input gas to the combustion chamber can be measured directly with temperature sensor and a pitot tube or other gas velocity sensor, or can be determined empirically from the temperature, pressure and other parameters of the compressor.

The signal processor 24 may use any of several suitable algorithms to determine the output total temperature $T_{04}$. A linear approximation to the following equation, which relates the output temperature $T_{04}$ to the measured parameters may be used.

$$T_{04}/T_{03} = \left[ 1 + \frac{(1 - (P_4/P_3))}{2\lambda/(\lambda - 1)[(P_{03}/P_3)^{(\lambda-1)/\lambda} - 1]} \right] \quad \text{(Eq. 1)}$$

$$\frac{[1 - (P_4/P_3)][(1 + \lambda)/2\lambda]}{[1 + [(P_{03}/P_3)^{(\lambda-1)/\lambda} - 1]}$$

where:
$T_0$=Total temperature, i.e. static temperature plus the temperature equivalent of the velocity head
$P_O$=Total pressure
M=Mach no.
P=static pressure
$\lambda$=specific heat ratio, i.e. 1.4 for air and 1.3 for combustion gases
sub 3=combustion chamber inlet
sub 4=combustion chamber outlet Eq. 1 assumes a constant cross-sectional area in the combustion chamber and frictionless flow. It should be noted that in the situation depicted in Eq. 1, the temperature rise ratio is nearly a linear function of the static pressure loss through the combustion chamber for a given combustion chamber inlet Mach No., $M_3$.

The pressure loss is reduced if the combustion chamber inlet Mach No. is low, but this increases the size of the combustion chamber. A combustion chamber inlet Mach No. $M_3$=0.2 ($P_{03}/P_3$=1.03) is typical. A combustion chamber static pressure loss of about 25 psi is common. This is easily measured at a typical combustion chamber pressure level of 350 psi with conventional pressure sensors.

The pressures velocity and temperature rise across the combustion chamber may be altered if the flow passage is not of constant cross sectional area. For example, if the combustion chamber diverges toward its outlet, the pressure loss will be reduced. However, under this condition the outlet static pressure, $P_4$, will be increased if there is no combustion present. Thus, a given combustion chamber geometry will have a static and total pressure change related to the temperature rise that can be calibrated and used to measure the temperature rise.

Alternatively, an experimentally measured pressure temperature relationship may be used as an algorithm in the signal processor 24 or an algorithm based upon the pressure flow and temperature relationship explained herein that also includes the losses due to friction. Friction losses will increase with increasing gas temperature due to increased velocity and due to the fact that the gas viscosity increases with increasing temperature.

Figure 2:
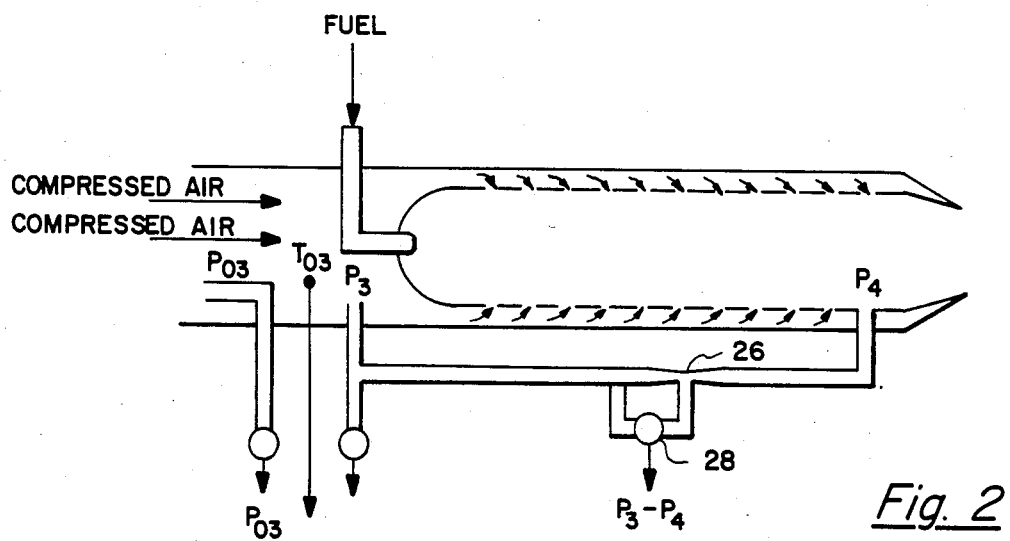
FIG. 2 is a schematic view of a preferred embodiment of the invention.

Referring now to FIG. 2, this preferred embodiment of the invention employs a flow tube 26 and a differential pressure measuring device 28 to measure the differential static pressure between the input and $P_3$ to the combustion chamber and the static pressure $P_4$ at the combustion chamber output.

As will be appreciated by those skilled in the art, the flow tube 26 provides a flow resistance in parallel with the resistance of the combustion chamber. When the combustion chamber pressure drop changes, the flow through the flow tube will change and the pressure differential across it will correspondingly change.

The pressure drop measured across the flow tube 26 is proportional to the difference in pressure between $P_3$ and $P_4$. This embodiment has the advantage of providing cooling air to the pressure tap in the exit of the combustion chamber.

The pressure measurements are used in eq. 1, or some approximation to eq. 1, to obtain the ratio of the total temperatures across the combustion chamber. The total temperature can be measured with a thermocouple or other sensor at the combustion chamber inlet, $T_{03}$. This then can be multiplied by the ratio $T_{04}/T_{03}$ to obtain the total temperature at the combustion chamber outlet.

Figure 3:
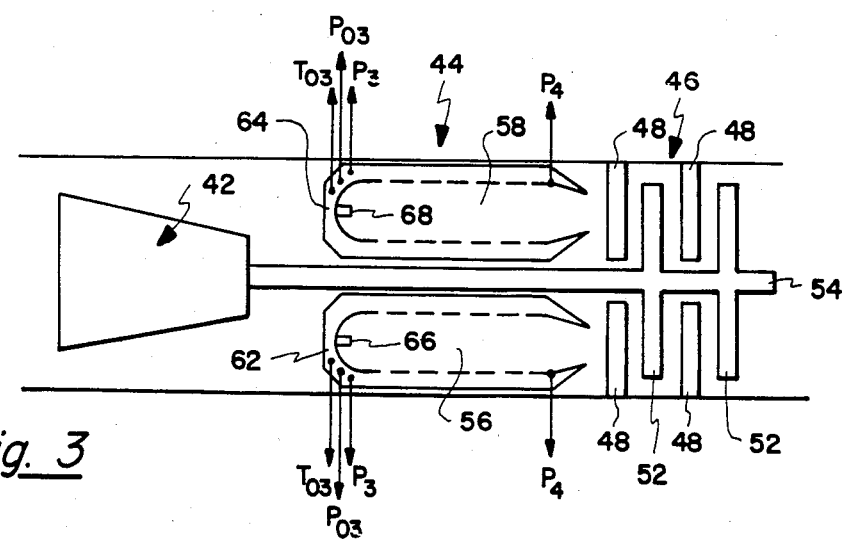
FIG. 3 is a schematic view of a gas turbine in which the gas temperature at the turbine inlet is monitored in accordance with the teachings of this invention.

Referring now to FIG. 3, it shows the principles of the invention applied to a gas turbine having a plurality of combustion chambers. The turbine has a compressor generally indicated by the reference numeral 42, a number of peripherally disposed combustion chambers in the central region indicated by the general reference numeral 44, and a turbine section indicated by the general reference numeral 46.

It will be appreciated that the turbine depicted in FIG. 3 is intended to be schematically representational of conventional turbines widely used throughout industry. The turbine section 46 has a series of stators 48 and turbine wheels 52 secured to a shaft 54 which also drives the compressor 42.

As previously mentioned in the region 44 there are a number of individual combusters, two of which are shown here indicated by the reference numerals 56 and 58. Plenums (not shown) couple compressed air from the output of compressor 42 to the inputs 62 and 64. The nozzles 66 and 68 supply fuel to the chambers and the high velocity combustion products leaving the chambers drive the turbine 46.

In accordance with the teachings more fully set forth in connection with FIGS. 1 and 2, the operation of each of the combusters, such as combuster 56 and combuster 58, can be individually monitored with respect to the temperature of the gas exiting from the combuster and impinging upon the turbine blades by determining the pressure drop across the individual combuster. To this end, suitable sensors are used, as shown in FIG. 3, to measure for each combuster the outlet static pressure $P_4$, the inlet static pressure $P_3$, the inlet total pressure $P_{03}$, and the inlet total temperature $T_{03}$. These parameters are used in the manner set forth in connection with FIGS. 2 and 3 to determine and monitor the temperatures of the gas at the respective outputs of the combusters.

In operation, it will be appreciated that if there is no combustion in one of the combusters 56 or 58, the total pressure at the outlet of the combuster is approximately the same as the pressure at its inlet and practically the same as the static pressure because of the relatively low gas velocity. When combustion is present, the total pressure and the static pressure will drop because of the thermo-dynamic irreversibility associated with the heating of the gas. The difference between the total pressure at the input and the static pressure at the output of the combuster provides a substantial signal that is directly related to the temperature rise in the gas flowing through the combustion chamber. If combustion fails, the gas velocity decreases as it exits from the combustion chamber and the static pressure rises to approach the input pressure giving an indication of combustion failure.

Thus it will be appreciated that the objects of the invention have been accomplished. By measuring the changes in the differential pressure across the combusters, changes in the outlet gas temperature used to drive the turbine can be quickly detected. Other characteristics and advantages of the invention have been set forth in the foregoing description, together with details of the structure and function of the invention, and the aspects for which exclusive rights are claimed are pointed out in the appended claims. The disclosure, however, is illustrative only, and changes may be made in detail, especially without departing from the spirit of the invention.

What is claimed is:

1. Apparatus for monitoring the temperature of the propulsion gas at the inlet to a turbine wheel in a turbine in which a compressor feeds air into a chamber where it is heated and the products exiting the chamber form the propulsion gas, comprising in combination;
   first means responsive to the static pressure of air fed into said chamber;
   second means responsive to the total temperature of the air fed into said chamber;
   third means responsive to the total pressure of the air fed to said chamber;
   fourth means responsive to the static pressure of the chamber products, and
   fifth means responsive to said first through fourth means for indicating the temperature of the gas exiting said chamber as a function of a static pressure drop across said chamber.

2. An apparatus according to claim 1 wherein said compressor feeds air into said chamber where it is mixed with a fuel and the air/fuel combustion products exiting the chamber form the propulsion gas.

3. An apparatus according to claim 1 wherein the temperature of the propulsion gas is calculated by multiplying the inlet temperature by a temperature rise ratio wherein the temperature rise ratio $T_{04}/T_{03}$ is given by $$T_{04}/T_{03} = \left[ 1 + \frac{(1 - (P_4/P_3))}{2\lambda/(\lambda - 1) [P_{03}/P_3]^{(\lambda-1)/\lambda} - 1} \right]$$

$$\frac{[1 - (P_4/P_3)][(1 + \lambda)/2\lambda]}{[1 + [(P_{03}/P_3)^{(\lambda-1)/\lambda} - 1]}$$

wherein:
$T_0$ = Total temperature, i.e. static temperature plus the temperature equivalent of the velocity head.
$P_0$ = Total pressure
$P$ = Static pressure
$\lambda$ = Specific heat ratio, i.e., 1.4 for air and 1.3 for combustion gases
Sub 3 = Combustion chamber inlet
Sub 4 = Combustion chamber outlet.

4. Apparatus for monitoring the temperature of the propulsion gas at the inlet to a turbine wheel in a gas turbine in which a compressor feeds air into a combustion chamber where it is mixed with a fuel and the air/fuel combustion products exiting the chamber form the propulsion gas, comprising in combination;
   a flow tube having two ends and a flow restriction intermediate said ends;
   means mounting one end of said flow tube so that it is responsive to the static pressure of the compressed air entering said combustion chamber;
   means mounting the other end of said flow tube so that it is responsive to the static pressure of the combustion products exiting said chamber;
   means for measuring a pressure drop across said restriction;
   means for measuring total temperature of air entering said combustion chamber;
   means for combining pressure measurements into a combustion chamber temperature rise ratio and then multiplying by the inlet temperature to obtain the temperature of the propulsion gas.

5. An apparatus according to claim 4 wherein the temperature rise ratio $T_{04}/T_{05}$ is given by:

$$T_{04}/T_{03} = \left[ 1 + \frac{(1 - (P_4/P_3))}{2\lambda/(\lambda - 1) [P_{03}/P_3]^{(\lambda-1)/\lambda} - 1} \right]$$

$$\frac{[1 - (P_4/P_3)][(1 + \lambda)/2\lambda]}{[1 + [(P_{03}/P_3)^{(\lambda-1)/\lambda} - 1]}$$

wherein:
$T_0$ = Total temperature, i.e. static temperature plus the temperature equivalent of the velocity head.
$P_0$ = Total pressure
$P$ = Static pressure
$\lambda$ = Specific heat ratio, i.e., 1.4 for air and 1.3 for combustion gases Sub 3 = Combustion chamber inlet Sub 4 = Combustion chamber outlet,

* * * * *